United States Patent
Akahori

(10) Patent No.: US 11,990,114 B2
(45) Date of Patent: May 21, 2024

(54) COMBINED WAVE DATA GENERATION METHOD, COMBINED WAVE DATA GENERATION PROGRAM, STORAGE MEDIUM, COMBINED WAVE DATA GENERATION DEVICE, AND WAVEFORM DATA GENERATION METHOD

(71) Applicant: LAPIS SEMICONDUCTOR CO., LTD., Yokohama (JP)

(72) Inventor: Hiroji Akahori, Yokohama (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 38 days.

(21) Appl. No.: 17/614,496

(22) PCT Filed: May 29, 2020

(86) PCT No.: PCT/JP2020/021369
§ 371 (c)(1),
(2) Date: Nov. 26, 2021

(87) PCT Pub. No.: WO2020/241832
PCT Pub. Date: Dec. 3, 2020

(65) Prior Publication Data
US 2022/0223138 A1 Jul. 14, 2022

(30) Foreign Application Priority Data
May 31, 2019 (JP) ................................. 2019-102317

(51) Int. Cl.
*G10K 15/02* (2006.01)
*B60Q 5/00* (2006.01)
*H04R 1/02* (2006.01)

(52) U.S. Cl.
CPC ............ *G10K 15/02* (2013.01); *B60Q 5/008* (2013.01); *H04R 1/025* (2013.01); *H04R 2499/13* (2013.01)

(58) Field of Classification Search
CPC ........ G10K 15/02; B60Q 5/008; H04R 1/025; H04R 2499/13
See application file for complete search history.

(56) References Cited

U.S. PATENT DOCUMENTS

| 6,169,241 B1 | 1/2001 | Shimizu |
| 2005/0113168 A1* | 5/2005 | Maeda ................... G10K 15/02 463/35 |

(Continued)

FOREIGN PATENT DOCUMENTS

| JP | H10307587 A | 11/1998 |
| JP | 2005-343360 A | 12/2005 |

(Continued)

OTHER PUBLICATIONS

International Search Report dated Aug. 17, 2020 for PCT/JP2020/021369, 3 pgs.

(Continued)

*Primary Examiner* — Daniel R Sellers
(74) *Attorney, Agent, or Firm* — Volentine, Whitt & Francos, PLLC

(57) ABSTRACT

The present invention generates data series indicating respective combined-wave data pieces by a first step of obtaining a reference time length as a reference of a time length of one combined wave, a sampling interval time, and a frequency fluctuation rate, a second step of calculating a total number of samples in the data series indicating the one combined wave on the basis of the reference time length, the sampling interval time, and the frequency fluctuation rate, a third step of calculating a rotation angle with respect to the sampling interval time on the basis of the total number of samples for each of plural sound data pieces, a fourth step of calculating combined values for the total number of samples, the combined values being obtained by combining respective values of the plural sound data pieces, the values being calculated on the basis of the rotation angles for the respective sampling interval times, a fifth step of generating a series of the combined values for the total number of samples for the respective sampling time intervals as a data series of the one combined-wave data piece, and performing a sequence of the processes of the second to the fifth steps by a predetermined times while changing the frequency fluctuation rate every time when the sequence of the processes is executed once.

9 Claims, 9 Drawing Sheets

(56) References Cited

U.S. PATENT DOCUMENTS

| | | | | |
|---|---|---|---|---|
| 2006/0056642 A1* | 3/2006 | Inoue | ............... | G10K 11/17883 381/71.11 |
| 2006/0177797 A1* | 8/2006 | Costello | ................. | G10K 15/02 434/29 |
| 2007/0223727 A1* | 9/2007 | Kobayashi | ............ | B60W 50/14 381/86 |
| 2011/0216916 A1* | 9/2011 | Hera | ...................... | G10K 15/02 381/86 |

FOREIGN PATENT DOCUMENTS

| | | |
|---|---|---|
| JP | 2011-207390 A | 10/2011 |
| WO | 2011-132347 A1 | 10/2011 |

OTHER PUBLICATIONS

Notice of Rejection dated May 9, 2023, Japanese Patent Application No. 2021-522803, 4 pgs.
English translation of Notice of Rejection dated May 9, 2023, 5 pgs.

\* cited by examiner

| SPEED RANGE | AF |
|---|---|
| Y1–Y2 | AF1 |
| Y2–Y3 | AF2 |
| Y3–Y4 | AF3 |
| ⋮ | ⋮ |
| Y(S-3)–Y(S-2) | AF(S-2) |
| Y(S-2)–Y(S-1) | AF(S-1) |
| Y(S-1)–Y(S) | AF(S) |

FIG. 8

COMBINED WAVE DATA GENERATION METHOD, COMBINED WAVE DATA GENERATION PROGRAM, STORAGE MEDIUM, COMBINED WAVE DATA GENERATION DEVICE, AND WAVEFORM DATA GENERATION METHOD

TECHNICAL FIELD

The present invention relates to a combined-wave data generation method for generating combined-wave data, especially plural combined-wave data pieces, a combined-wave data generation program, a storage medium storing the program, a combined-wave data generation device, and a waveform data generation method.

BACKGROUND ART

As electric vehicles and electric hybrid vehicles that run using electric motors, there has been commercialized one including a vehicle approaching notification device that outputs a sound (hereinafter referred to as a vehicle approaching sound) that notifies an approach of its own vehicle outside the vehicle because a noise at low-speed running is extremely small compared with engine vehicles.

The vehicle approaching notification device changes a tone of the vehicle approaching sound on the basis of the running speed when the vehicle is running at a lower speed than a predetermined speed.

As such a vehicle approaching notification device, there has been proposed one that includes a memory in which plural pieces of tone generation data of mutually different tones are preliminarily stored preliminarily corresponded to the running speed of the vehicle (for example, see Patent Document 1). As the tone generation data, for example, one expressing a tire noise and an engine sound of an actually running vehicle with a synthetic sound is used.

In the vehicle approaching notification device, first, a tone generation data piece indicating a synthetic sound corresponding to a current running speed of the vehicle is read out from the memory. Then, the vehicle approaching notification device converts the tone generation data pieces that are sequentially read out from the memory and mutually connected into an analog sound signal, and acoustically outputs it outside the vehicle through a speaker.

Patent Document 1: JP-A-2011-207390

DISCLOSURE OF THE INVENTION

Problems to be Solved by the Invention

However, in a sound device, such as the above-described vehicle approaching notification device, in which the vehicle approaching sound is generated on the basis of the data piece (tone generation data) that is read out from the memory and represents the synthetic sound, a noise sound is superimposed on the vehicle approaching sound at a connecting portion between the data pieces in some cases.

Therefore, the present invention has an object to provide a combined-wave data generation method, a combined-wave data generation program, a storage medium, a combined-wave data generation device, and a waveform data generation method that allow suppressing generation of a noise sound.

Solutions to the Problem

A combined-wave data generation method according to the present invention is a combined-wave data generation method for generating plural combined-wave data pieces each representing a data series indicating one combined wave obtained by combining plural sound data pieces having mutually different frequencies. the combined-wave data generation method includes: a first step of obtaining a reference time length as a reference of a time length of the one combined wave, a sampling interval time, and a frequency fluctuation rate; a second step of calculating a total number of samples in the data series indicating the one combined wave on the basis of the reference time length, the sampling interval time, and the frequency fluctuation rate; a third step of calculating a rotation angle with respect to the sampling interval time on the basis of the total number of samples for each of the plural sound data pieces having the mutually different frequencies; a fourth step of calculating combined values for the total number of samples, the combined value being obtained by combining respective values of the plural sound data pieces having the mutually different frequencies, and the values being calculated on the basis of the rotation angles for the respective sampling interval times; a fifth step of generating a series of the combined values for the total number of samples for the respective sampling time intervals as a data series of the one combined-wave data piece; and a sixth step of generating data series representing the respective combined-wave data pieces by performing a sequence of the processes of the second step, the third step, the fourth step, and the fifth step by a predetermined times while changing the frequency fluctuation rate every time when the sequence of the processes is executed once.

A combined-wave data generation program according to the present invention is a combined-wave data generation program executed by a control part of a combined-wave data generation device configured to generate plural combined-wave data pieces each representing a data series indicating one combined wave obtained by combining plural sound data pieces having mutually different frequencies, the combined-wave data generation program includes: a first step of obtaining a reference time length as a reference of a time length of the one combined wave, a sampling interval time, and a frequency fluctuation rate; a second step of calculating a total number of samples in the data series indicating the one combined wave on the basis of the reference time length, the sampling interval time, and the frequency fluctuation rate; a third step of calculating a rotation angle with respect to the sampling interval time on the basis of the total number of samples for each of the plural sound data pieces having the mutually different frequencies; a fourth step of calculating combined values for the total number of samples, the combined value being obtained by combining respective values of the plural sound data pieces having the mutually different frequencies, the values being calculated on the basis of the rotation angles for the respective sampling interval times; a fifth step of generating a series of the combined values for the total number of samples for the respective sampling time intervals as a data series of the one combined-wave data piece; and a sixth step of generating data series representing the respective combined-wave data pieces by performing a sequence of the processes of the second step, the third step, the fourth step, and the fifth step by a predetermined times while changing the frequency fluctuation rate every time when the sequence of the processes is executed once.

A storage medium according to the present invention is a storage medium that stores a combined-wave data generation program executed by a control part of a combined-wave data generation device configured to generate plural combined-wave data pieces each representing a data series indicating one combined wave obtained by combining plural sound data pieces having mutually different frequencies, the combined-wave data generation program includes: a first step of obtaining a reference time length as a reference of a time length of the one combined wave, a sampling interval time, and a frequency fluctuation rate; a second step of calculating a total number of samples in the data series indicating the one combined wave on the basis of the reference time length, the sampling interval time, and the frequency fluctuation rate; a third step of calculating a rotation angle with respect to the sampling interval time on the basis of the total number of samples for each of the plural sound data pieces having the mutually different frequencies; a fourth step of calculating combined values for the total number of samples, the combined value being obtained by combining respective values of the plural sound data pieces having the mutually different frequencies, the values being calculated on the basis of the rotation angles for the respective sampling interval times; a fifth step of generating a series of the combined values for the total number of samples for the respective sampling time intervals as a data series of the one combined-wave data piece; and a sixth step of generating data series representing the respective combined-wave data pieces by performing a sequence of the processes of the second step, the third step, the fourth step, and the fifth step by a predetermined times while changing the frequency fluctuation rate every time when the sequence of the processes is executed once.

A combined-wave data generation device according to the present invention is a combined-wave data generation device configured to generate plural combined-wave data pieces each representing a data series indicating one combined wave obtained by combining plural sound data pieces having mutually different frequencies. the combined-wave data generation device includes a control part configured to execute: a first step of obtaining a reference time length as a reference of a time length of the one combined wave, a sampling interval time, and a frequency fluctuation rate; a second step of calculating a total number of samples in the data series indicating the one combined wave on the basis of the reference time length, the sampling interval time, and the frequency fluctuation rate; a third step of calculating a rotation angle with respect to the sampling interval time on the basis of the total number of samples for each of the plural sound data pieces having the mutually different frequencies; a fourth step of calculating combined values for the total number of samples, the combined value being obtained by combining respective values of the plural sound data pieces having the mutually different frequencies, the values being calculated on the basis of the rotation angles for the respective sampling interval times; a fifth step of generating a series of the combined values for the total number of samples for the respective sampling time intervals as a data series of the one combined-wave data piece; and a sixth step of generating data series representing the respective combined-wave data pieces by performing a sequence of the processes of the second step, the third step, the fourth step, and the fifth step by a predetermined times while changing the frequency fluctuation rate every time when the sequence of the processes is executed once.

A waveform data generation method according to the present invention is a waveform data generation method for generating plural waveform data pieces each indicating a data series representing one waveform. the waveform data generation method includes: a first step of obtaining a reference time length as a reference of a time length of the one waveform, a sampling interval time, and a frequency fluctuation rate; a second step of calculating a total number of samples in the data series indicating the one waveform on the basis of the reference time length, the sampling interval time, and the frequency fluctuation rate; a third step of calculating a rotation angle with respect to the sampling interval time on the basis of the total number of samples for the one waveform; a fourth step of calculating a value of the one waveform for the total number of samples, the value being calculated on the basis of the rotation angle for each sampling interval time; a fifth step of generating a series of the values of the one waveform for the total number of samples for the respective sampling time intervals as a data series of the one waveform data piece; and a sixth step of generating data series representing the respective waveform data pieces by performing a sequence of the processes of the second step, the third step, the fourth step, the fifth step by a predetermined times while changing the frequency fluctuation rate every time when the sequence of the processes is executed once.

Effects of the Invention

According to the present invention, as a data series represented by combined-wave data pieces in which plural sound data pieces having mutually different frequencies are combined, one in which a first sample value and a last sample value have an identical value can be generated.

With the combined-wave data piece, when the combined-wave data pieces are mutually connected to generate an audible sound, since a rapid change of the sound level at the connecting portion can be suppressed, a satisfactory audible sound can be generated without an uncomfortable feeling wile suppressing an unnecessary noise sound.

BRIEF DESCRIPTION OF THE DRAWINGS

FIG. 8 is a diagram illustrating an exemplary memory map of an audio memory 121.

DESCRIPTION OF PREFERRED EMBODIMENTS

The following describes embodiments of the present invention in detail with reference to the drawings.

Figure 1:
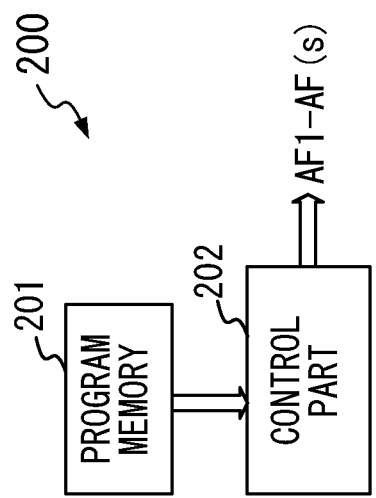
FIG. 1 is a block diagram illustrating a configuration of a combined-wave data generation device 200 that generates combined-wave data AF1 to AF(S).
Figure 2:
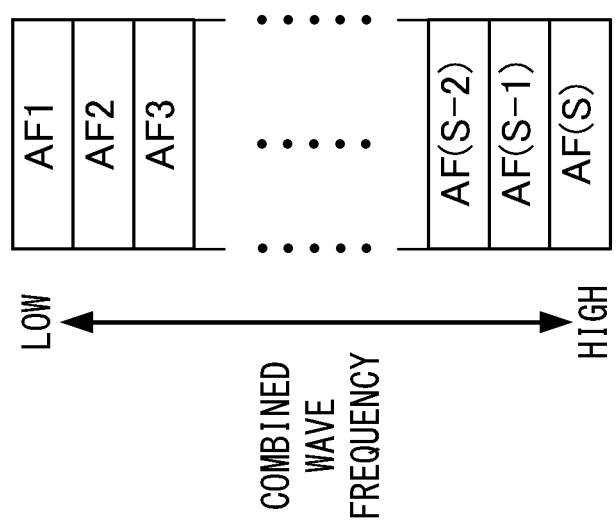
FIG. 2 is a diagram illustrating a high-low relationship of frequencies of audible sounds based on the combined-wave data AF1 to AF(S).

FIG. 1 is a block diagram illustrating a configuration of a combined-wave data generation device 200 that generates combined-wave data AF1 to AF(S) (S is an integer of 2 or more) representing audible sounds having mutually different frequencies as illustrated in FIG. 2 in accordance with a combined-wave data generation method according to the present invention.

As illustrated in FIG. 1, the combined-wave data generation device 200 includes a program memory 201 and a control part 202.

The program memory 201 stores a combined-wave data generation program for generating the combined-wave data AF1 to AF(S). The program memory 201 is configured by a storage medium, for example, a NAND or NOR flash memory, a non-volatile semiconductor memory such as a ROM, or a hard disk of magnetic recording type.

Figure 3:
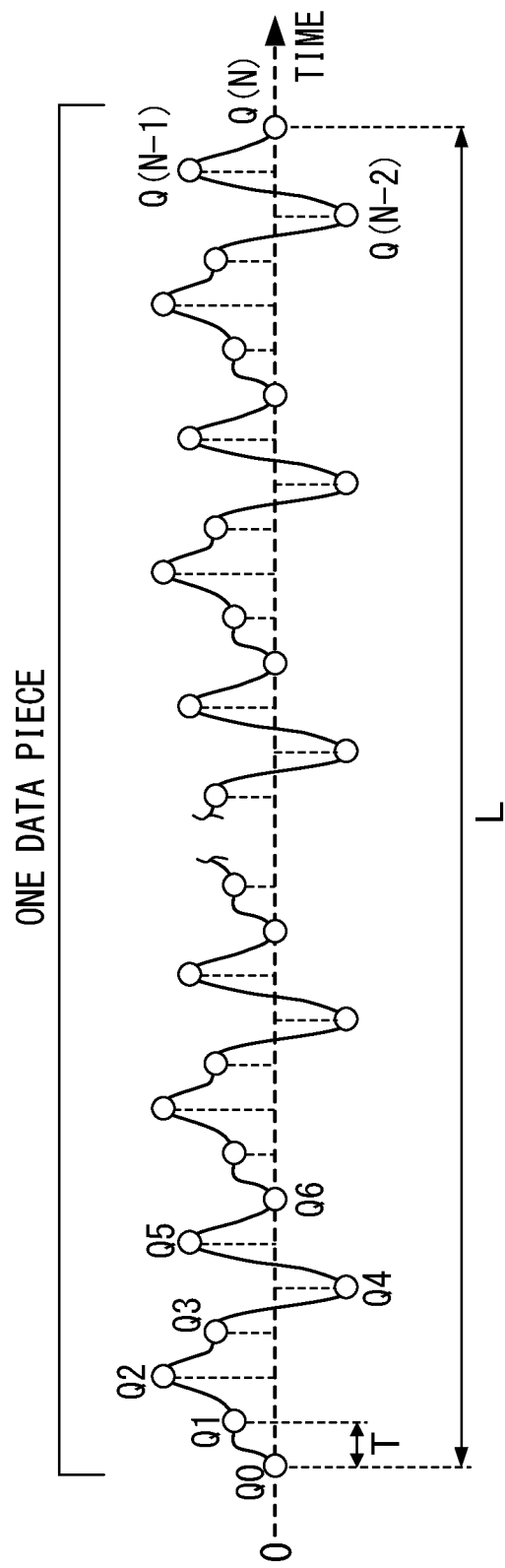
FIG. 3 is a diagram illustrating exemplary series Q0 to Q(N) of sample values indicating respective combined-wave data AF1 to AF(S).

The control part 202 executes the combined-wave data generation program stored in the program memory 201. Thus, the control part 202 generates the combined-wave data AF1 to AF(S) each representing an audible sound of a length of one data piece as a data series of sample values Q0 to Q(N) (N is an integer of 2 or more) of sampling interval times T as illustrated in FIG. 3.

Figure 4:
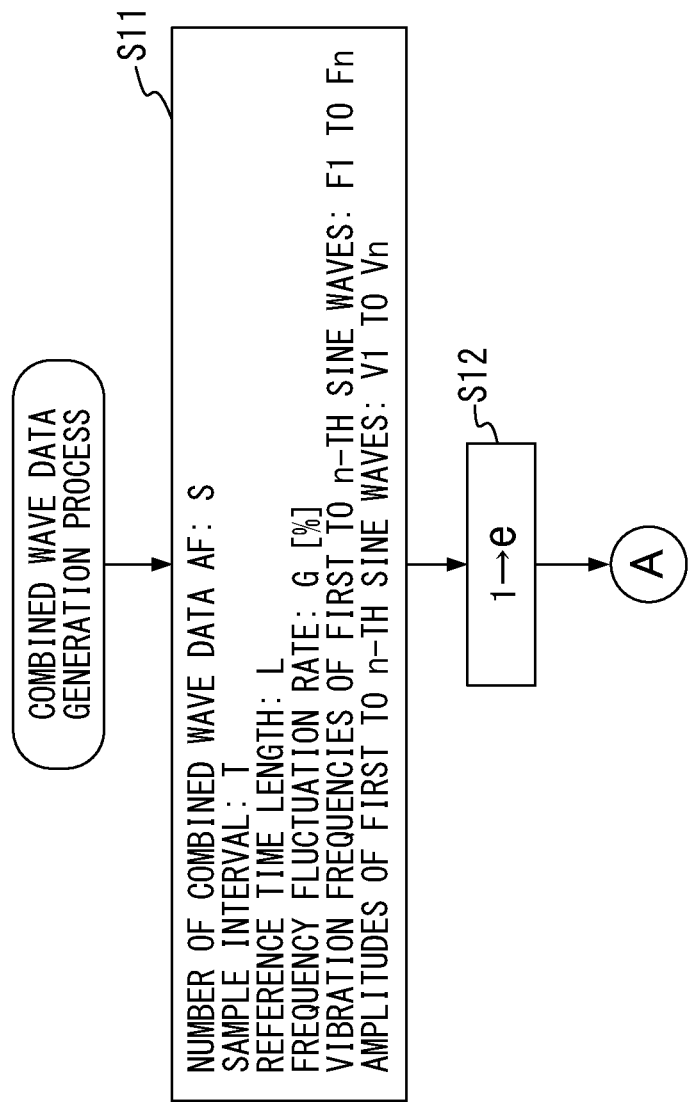
FIG. 4 is a flowchart illustrating an exemplary combined-wave data generation routine executed by a control part 202 in accordance with a combined-wave data generation program.
Figure 5:
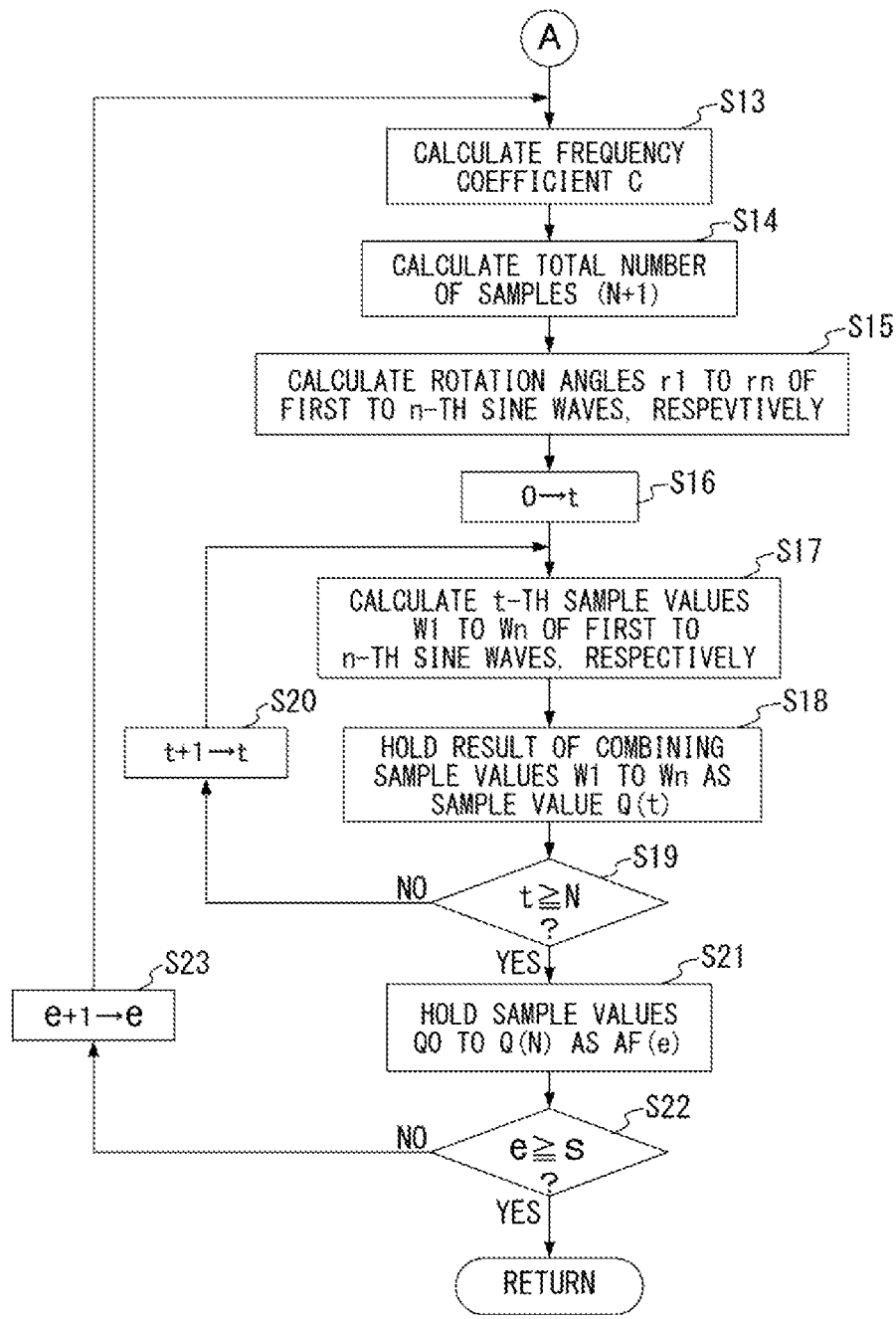
FIG. 5 is a flowchart illustrating the exemplary combined-wave data generation routine executed by the control part 202 in accordance with the combined-wave data generation program.

FIG. 4 and FIG. 5 are flowcharts illustrating an exemplary combined-wave data generation routine executed by the control part 202 in accordance with the combined-wave data generation program.

Each of the combined-wave data AF1 to AF(S) generated by the combined-wave data generation program represents a combined wave in which first to n-th (n is an integer of 2 or more) sine waves having different frequencies are combined. That is, one combined-wave data AF includes combined first to n-th sound data pieces representing the first to the n-th sine waves. In this respect, it is not necessary that all of the first to the n-th sine waves have the frequency in an audible band, and a part of the sine waves may have the frequency out of the audible band.

In FIG. 4, first, the control part 202 obtains each of various parameters below (Step S11).

Total number S of combined-wave data AF
Sampling interval time T [second]
Reference time length L [second] of one sound data piece
Frequency fluctuation rate G [%] for each combined-wave data AF
Vibration frequencies F1 to Fn in reference time length L of first to n-th sine waves
Amplitudes V1 to Vn of first to n-th sine waves For example, when a vehicle approaching sound is assumed as the audible sound, and the frequency of the vehicle approaching sound is changed in increments of 0.2 [km/h] within a speed range of 0 to 50 [km/h], 50×(1/0.2)+1=251 pieces of the combined-wave data AF is necessary. At this time, the control part 202 obtains "251" as the total number S of the combined-wave data AF.

When a sampling frequency of the vehicle approaching sound is assumed to, for example, 48 [ksps], the control part 202 obtains 1/48000 seconds as the sampling interval time T.

The control part 202 obtains, for example, 0.48 seconds, which is a time period of integral multiple of 1/48000 seconds as the sampling interval time T, as the reference time length L that is a reference of a playback time period of a sound by one sound data piece.

For example, when the frequency of the vehicle approaching sound is increased in increments of 0.2 [km/h], the control part 202 obtains 0.5% as the frequency fluctuation rate G that specifies the fluctuation rate of the frequency in a period of speed increase by 0.2 [km/h].

The control part 202 obtains vibration frequencies F1 to Fn indicating vibration frequencies (integers) in the reference time length L for the first to n-th sine waves to be combined, respectively. The vibration frequencies F1 to Fn correspond to the frequencies required for the first to the n-th sine waves, respectively. For example, when the frequency required for the first sine wave is 400 [Hz] and the reference time length L is, for example, 0.48 seconds, the vibration frequency F1 within 0.48 seconds is 192 times as a result of 0.48 seconds*400 [Hz].

Especially, in Step S11, the respective values of the reference time length L and vibration frequencies F1 to Fn are determined for all of the combined-wave data AF1 to AF(S) such that the first sample value Q0 and the last sample value Q(N) in the series of the sample values Q0 to Q(N) illustrated in FIG. 3 have an identical value.

For the above-described various parameters, the control part 202 may retrieve one stored in a ROM (Read Only Memory) or the like, or may receive an input of a required parameter as necessary.

After executing Step S11 described above, the control part 202 sets an initial value "1" as a number e that specifies one of the combined-wave data AF1 to AF(S) (Step S12).

Next, the control part 202 calculates the frequency fluctuation coefficients C of the first to the n-th sine waves in the combined-wave data AF(e) by a formula below (Step S13).

$$C = (1 + G/100)^{(e-1)}$$

Next, the control part 202 calculates N (N is an integer of 2 or more) of the total number of samples (N+1) in the data series represented by the one sound data piece as illustrated in FIG. 3 by a function formula to round off to the nearest whole number below (Step S14).

$$N = \text{Round } [L/(T \cdot C)]$$

In the calculation of "N" in Step S14, numbers after the decimal point as a result of [L/(T·C)] may be rounded down or rounded up.

Next, the control part 202 calculates rotation angles r1 to rn per sample of the first to n-th sine waves, respectively by formulas below (Step S15).

First sine wave rotation angle $r1 = F1/N$

Second sine wave rotation angle $r2 = F2/N$

Third sine wave rotation angle $r3 = F3/N$ $\vdots$ n-th sine wave rotation angle $rn = Fn/N$ Next, the control part 202 sets an initial value "0" as a number t to specify one sample in the data series of the sample values in one sound data piece (Step S16).

Next, the control part 202 calculates t-th sample values W1 to Wn in one sound data piece of the first to the n-th sine waves, respectively by formulas below (Step S17).

First sine wave sample value $W1 = V1 \cdot \sin(2\pi t \cdot r1 + \alpha 1)$

Second sine wave sample value $W2 = V2 \cdot \sin(2\pi t \cdot r2 + \alpha 2)$

Third sine wave sample value $W3 = V3 \cdot \sin(2\pi t \cdot r3 + \alpha 3)$ $\vdots$ n-th sine wave sample value $Wn = Vn \cdot \sin(2\pi t \cdot rn + \alpha n)$ $\alpha 1, \alpha 2, \alpha 3, \ldots$, an are shift rotation angles of 0° or 180°

Next, the control part 202 obtains the sample value Q(t) by combining the t-th sample values W1 to Wn of the first to the n-th sine waves, respectively calculated in Step S17, that is, a result of a sum of W1 to Wn, and holds it in an included register (not illustrated) (Step S18).

Next, the control part 202 determines whether the number t to specify the sample value is N or more or not (Step S19).

In Step S19, when the number t is determined not to be N or more, the control part 202 sets a number obtained by adding "1" to the number t to a new number t (Step S20). After executing Step S20, the control part 202 returns to Step S17 described above, and executes above-described Steps S17 and S18 again.

That is, the control part 202 repeatedly executes Steps S17 and S18 until the number t becomes N, thereby generating the series of the sample values Q0 to Q(N) representing the combined wave in which the first to the n-th sine waves are combined.

Here, in Step S19, when the number t is determined to be N or more, the control part 202 holds the series of the sample values Q0 to Q(N) described above in the included register as the sample values Q0 to Q(N) of the combined-wave data AF(e) (Step S21).

After executing Step S21, the control part 202 determines whether the number e to specify one of the combined-wave data AF1 to AF(S) is equal to or more than the total number S of the combined-wave data AF or not (Step S22). In Step S22, when the number e is determined not to be equal to or more than the total number S of the combined-wave data AF, the control part 202 sets a number obtained by adding "1" to the number e to a new number e (Step S23). After executing Step S23, the control part 202 returns to Step S13 described above, and executes a sequence of the processes of Steps S13 to S21 described above again.

Thus, the control part 202 executes the sequence of the processes of Steps S13 to S21 until the number e becomes equal to or more than the total number S of the combined-wave data AF, thereby generating the combined-wave data AF1 to AF(S) that each include the data series of the sample values Q0 to Q(N) and each represent the combined wave having the different frequency. Since the respective frequencies of the combined waves represented by the combined-wave data AF have the frequency fluctuation rates G of positive values, the frequencies increase in the order of AF1, AF2, AF3, . . . , AF(S) as illustrated in FIG. 2. In this respect, the higher the frequency of the combined wave is, the higher sound is audible.

That is, first, the control part 202 obtains information to specify the reference time length L, the sampling interval time T, the frequency fluctuation rate G, and the vibration frequencies F1 to Fn of the first to the n-th sine waves, respectively (S11). Next, on the basis of the frequency fluctuation coefficient C calculated for each combined-wave data AF on the basis of the frequency fluctuation rate G, the control part 202 obtains the total number of samples (N+1) decreasing as the frequency fluctuation coefficient C increases (S14). Then, the rotation angles r1 to rn corresponding to the first to the n-th sine waves, respectively are calculated for each combined-wave data AF on the basis of the total number of samples (N+1) and the vibration frequencies F1 to Fn (S15).

Next, for each combined-wave data AF, the sample values W1 to Wn are obtained by multiplying n values obtained by rotating the phases of the respective sine waves on the basis of the rotation angles r1 to rn by the amplitudes V1 to Vn, respectively (S17). Next, for each combined-wave data AF, the sample value Q as a combined value in which the sample values W1 to Wn calculated on the basis of the rotation angles r1 to rn for each sampling interval time T are combined is obtained, and the sample values Q for the total number of samples (N+1) are obtained (S18 to S20). Here, the series of the sample values Q0 to Q(N) for the total number of samples (N+1) is obtained as the data series of the combined-wave data AF (S21).

Accordingly, the data series of each combined-wave data AF in which both the first sample value Q0 and the last sample value Q(N) are at zero level in an identical phase can be generated.

Especially, by determining the reference time length L as a reference of the length of the sound represented by one sound data piece and the vibration frequencies F1 to Fn of the first to the n-th sine waves in the reference time length L with the vibration frequencies F1 to Fn that are all integers and the reference time length L that is an integral multiple of the sampling interval time T, the first sample value Q0 and the last sample value Q(N) in the data series of each combined-wave data AF can be set to the identical value.

Accordingly, when pieces of thus generated combined-wave data AF are mutually connected to generate an audible sound, a rapid change of the sound level at the connecting portion can be suppressed, thus allowing generating a satisfactory audible sound without an uncomfortable feeling wile suppressing an unnecessary noise sound.

Incidentally, in the above-described combined-wave data generation process, the respective vibration frequencies of the first to the n-th sine waves combined in each combined-wave data AF are fixed to F1 to Fn. Accordingly, as the frequency of the audible sound to be expressed increases, the total number of samples in the combined-wave data AF decreases, and the length of the sound represented by the combined-wave data AF also decreases on the basis of it. That is, for example, the length of the sound represented by each of the combined-wave data AF1 to AF(S) is maximum (reference time length L) in the combined-wave data AF1, and gradually shortened in the order of AF2, AF3, . . . , AF(S).

While the first sample of every sine wave is started from the rotation angle 0° in each combined-wave data AF in the above-described embodiment, a combined waveform similarly becomes zero even when a part of the sine waves among the first to the n-th sine waves is started from the rotation angle 180°. For example, the first sample values of the respective odd-numbered sine waves among the first to the n-th sine waves are started from the rotation angle 0°, and the first sample values of the respective even-numbered sine waves are started from the rotation angle 180°. At this time, the odd-numbered shift rotation angles α1, α3, α5, . . . are set to 0°, and the even-numbered shift rotation angles α2, α4, α6, . . . are set to 180° in the formula executed in Step S17. Basically, at least one shift rotation angle of the shift rotation angles α1 to αn is set to 0°, and other shift rotation angles are set to 180°.

Thus, the sine wave having the first sample value started from the rotation angle 180° and the sine wave having the first sample value started from the rotation angle 0° are mixed, thereby allowing avoiding an excessive value of the sample value at a part of the sample timings. While the example in which the shift rotation angles are differed between the odd number and the even number is described above, the combination of the shift rotation angles is obviously not limited to this.

In the above-described embodiment, the sequence of the processes of Steps S13 to S21 is repeatedly executed, thereby generating the combined-wave data AF1 to AF(S) in which the frequency of the sine wave increases in the order of AF1, AF2, AF3, . . . , AF(S). However, for example, by setting the frequency fluctuation rate G to a negative value, the combined-wave data AF1 to AF(S) in which the frequency of the sine wave decreases in the order of AF1, AF2, AF3, . . . , AF(S) may be generated.

Basically, it is only necessary that plural pieces [AF1 to AF(S)] of the combined-wave data piece (AF) representing the data series [Q0 to Q(N)] as one combined wave obtained by combining plural sound data pieces (first to n-th sine waves) having the mutually different frequencies are generated by processes of first to sixth steps below.

That is, in the first step (S11), the reference time length (L) as a reference of the time length of one combined wave, the sampling interval time (T), and the frequency fluctuation rate (G) are obtained. In the second step (S14), on the basis of reference time length, the sampling interval time, and the frequency fluctuation rate, the total number of samples [(N+1)] in the data series representing one combined wave is calculated. In the third step (S15), for each of the plural sound data pieces (for example, first to n-th sine waves) having the mutually different frequencies, the rotation angle (r1 to rn) with respect to the sampling interval time is calculated on the basis of the above-described total number of samples. In the fourth step (S17, S18), the combined values (Q) are calculated for the total number of samples, the combined value (Q) is obtained by combining the respective values (W1 to Wn) of the plural sound data pieces (n) having the mutually different frequencies, and the values (W1 to Wn) are calculated on the basis of the rotation angles for the respective sampling interval times. In the fifth step (S21), a series of the combined values for the total number of samples for the respective sampling time intervals is generated as a data series of one combined-wave data piece (AF).

Then, in the sixth step (S13 to S23), a sequence of the processes of the second to fifth steps is performed by a predetermined times (S times) while changing the frequency fluctuation rate every time when the sequence of the processes is executed once (S23, S13), thereby generating the data series [Q0 to Q(N)] representing the respective combined-wave data pieces [AF1 to AF(S)].

Incidentally, in the example illustrated in FIG. 4 and FIG. 5, as each of the S waveform data pieces [AF1 to AF(S)] representing audible sounds having the mutually different frequencies, one representing the combined wave in which the first to the n-th sine waves are combined is employed. However, as plural waveform data pieces representing the audible sounds having the mutually different frequencies, for example, one representing a single sine wave, rectangular wave, or sawtooth wave may be generated.

Basically, in the generation of plural waveform data pieces as the data series representing one waveform, similarly to the above-described case where the plural combined-wave data pieces are generated, a waveform data generation method including first to sixth steps below is employed.

That is, in the first step, the reference time length as a reference of the time length of one waveform, the sampling interval time, and the frequency fluctuation rate are obtained. In the second step, on the basis of the reference time length, the sampling interval time, and the frequency fluctuation rate, the total number of samples in the data series representing one waveform is calculated. In the third step, for one waveform, the rotation angle with respect to the sampling interval time is calculated on the basis of the total number of samples. In the fourth step, a value of the one waveform is calculated for the total number of samples, and the value is calculated on the basis of the rotation angle for each sampling interval time. In the fifth step, a series of the values of the one waveform for the total number of samples for the respective sampling time intervals is generated as a data series of one waveform data piece.

Then, in the sixth step, a sequence of the processes of the second to fifth steps is performed by a predetermined number of times while changing the frequency fluctuation rate every time when the sequence of the processes is executed once, thereby generating the data series representing the respective wave data pieces.

Figure 6:
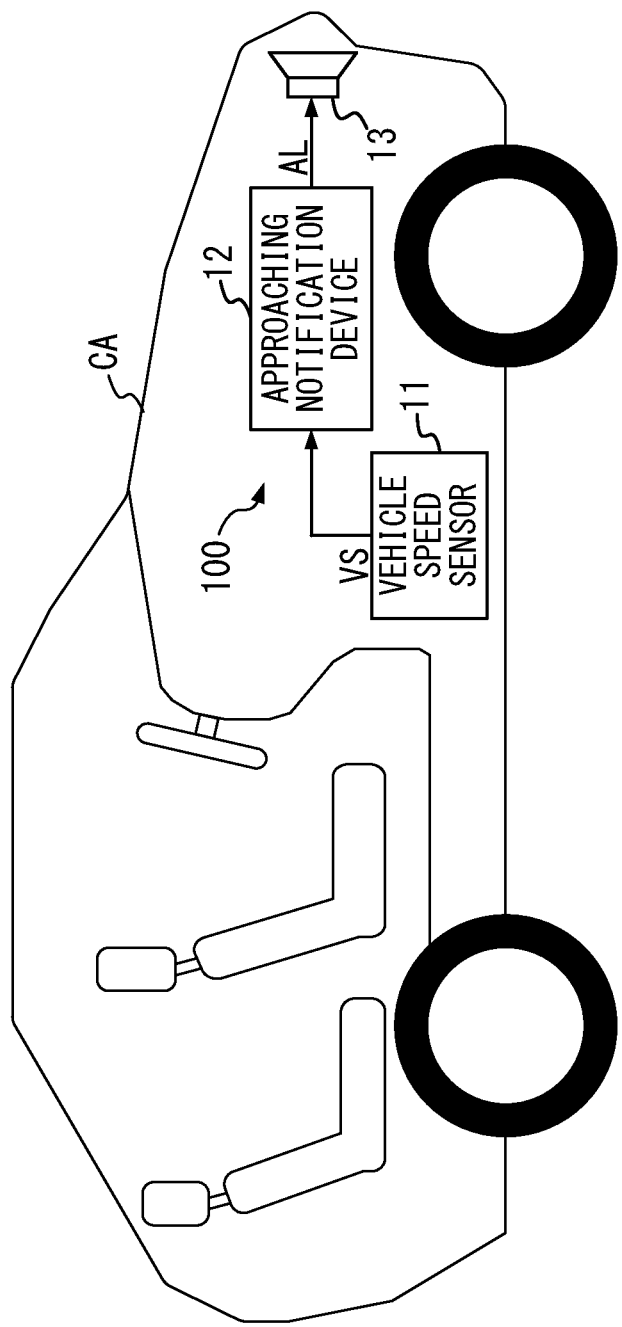
FIG. 6 is a block diagram illustrating a configuration of a vehicle approaching notification system 100 included in a vehicle CR.

FIG. 6 is a block diagram illustrating a configuration of a vehicle approaching notification system 100 included in a vehicle CR as an exemplary sound device configured to generate an audible sound on the basis of the combined-wave data AF1 to AF(S) generated by the combined-wave data generation process illustrated in FIG. 4 and FIG. 5.

The vehicle approaching notification system 100 includes a vehicle speed sensor 11, an approaching notification device 12, and a speaker 13.

The vehicle speed sensor 11 supplies a speed signal VS indicating a running speed of the vehicle CR to the approaching notification device 12.

The approaching notification device 12 generates a vehicle approaching sound signal AL having a frequency component of an audible band corresponding to a running speed indicated by the speed signal VS, and supplies the vehicle approaching sound signal AL to the speaker 13.

The speaker 13 is installed at, for example, a front bumper of the vehicle CR, and emits an audible sound based on the vehicle approaching sound signal AL as a vehicle approaching sound to a space outside the vehicle CR.

Figure 7:
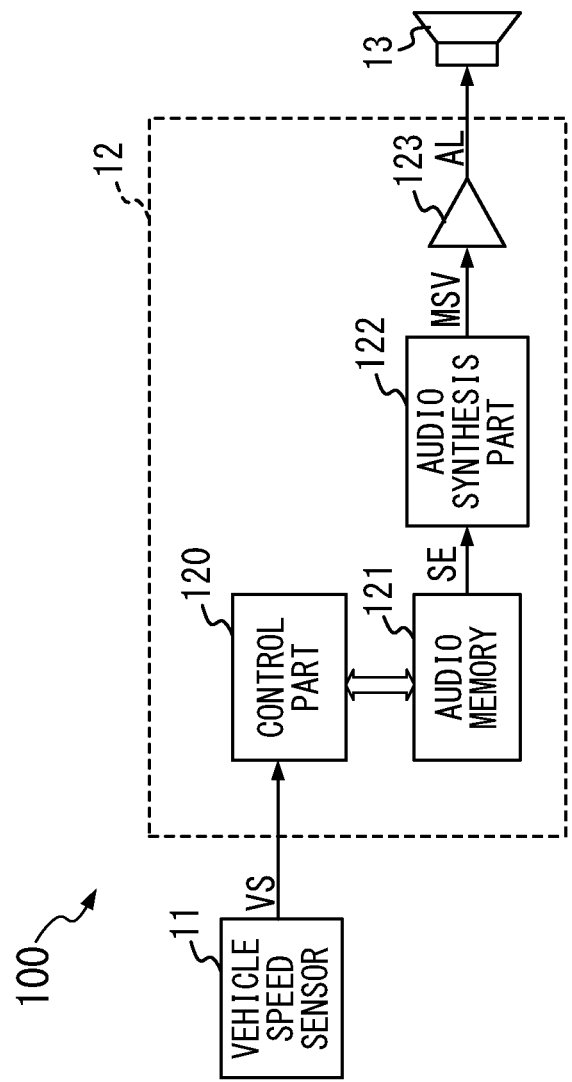
FIG. 7 is a block diagram illustrating a configuration of an approaching notification device 12.

FIG. 7 is a block diagram illustrating an internal configuration of the approaching notification device 12.

As illustrated in FIG. 7, the approaching notification device 12 includes a control part 120, an audio memory 121, an audio synthesis part 122, an amplifier 123, and an external terminal TP.

The control part 120 receives the speed signal VS, and performs a read access to read a combined-wave data piece corresponding to the running speed indicated by the speed signal VS from the audio memory 121 to the audio memory 121.

The audio memory 121 stores the combined-wave data AF1 to AF(S) individually indicating plural vehicle approaching sounds having the mutually different frequency components in association with respective speed ranges into which a range of the running speed to generate the vehicle approaching sound is divided. The audio memory 121 is configured by a storage medium, for example, a NAND or NOR flash memory, a non-volatile semiconductor memory such as a PROM (Programmable ROM), or a hard disk of magnetic recording type.

FIG. 8 is a diagram illustrating an exemplary memory map of the audio memory 121.

As illustrated in FIG. 8, the audio memory 121 stores the combined-wave data AF1 to AF(S) in association with respective S (S is an integer of 2 or more) speed ranges into which the running speed to generate the vehicle approaching sound is divided.

That is, as illustrated in FIG. 8, the audio memory 121 stores the combined-wave data AF1 in association with the speed range of a speed Y1 to a speed Y2 (for example, 0 to 0.5 [km/h]). The audio memory 121 stores the combined-wave data AF2 corresponding to the vehicle approaching sound having a higher frequency than the combined-wave data AF1 in association with the range of the speed Y2 to a speed Y3 (for example, 0.5 to 1.0 [km/h]). The audio memory 121 stores the combined-wave data AF3 corresponding to the vehicle approaching sound having a higher frequency than the combined-wave data AF2 in association with the range of the speed Y3 to a speed Y4 (for example, 1.0 to 1.5 [km/h]).

The combined-wave data AF1 to AF(S) each represent the vehicle approaching sound of the length of the reference time length L by the series (indicated by white circles) of the sample values Q0 to Q(N) of the sampling interval times T as illustrated in FIG. 3.

That is, as illustrated in FIG. 3, in the sample values Q0 to Q(N) included in each combined-wave data AF, the first sample value Q0 is at zero level representing soundless, and the last sample value Q(N) is the identical value as the first sample value Q0.

The audio memory 121 reads out one combined-wave data AF corresponding to the speed range including the running speed indicated by the speed signal VS from the combined-wave data AF1 to AF(S) in response to the read access from the control part 120.

Figure 9:
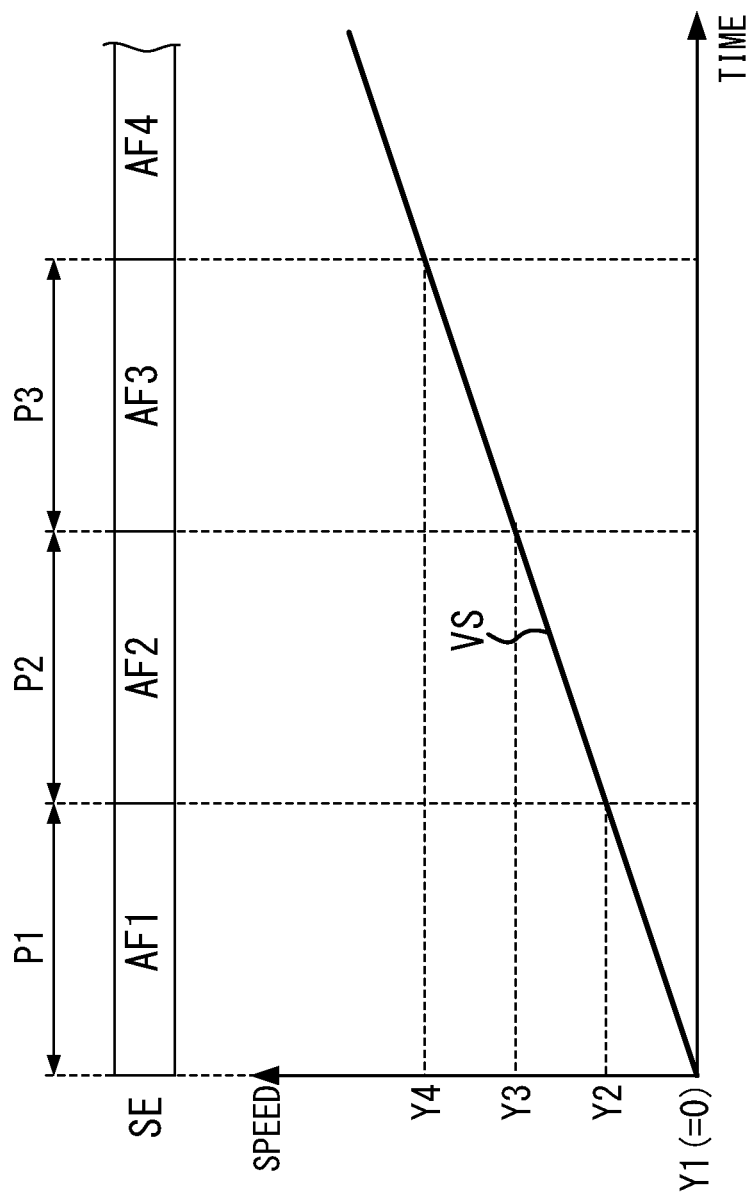
FIG. 9 is a timing chart illustrating an exemplary configuration of a synthetic sound data signal SE including the series of the combined-wave data AF read out from the audio memory 121 on the basis of a speed signal VS.

FIG. 9 is a timing chart illustrating an exemplary configuration of a synthetic sound data signal SE including the combined-wave data AF read out from the audio memory 121 on the basis of the speed signal VS.

For example, during a period P1 from a state where the vehicle CR stops (speed Y1=0 [km/h]) to reaching of the running speed at the speed Y2 as illustrated in FIG. 9, the control part 120 repeatedly reads out the combined-wave data AF1 from the audio memory 121. Specifically, the control part 120 sequentially reads out the sample values Q0 to Q(N) illustrated in FIG. 3 included in the combined-wave data AF1 from the audio memory 121, and sequentially reads out the sample values Q0 to Q(N) included in the combined-wave data AF1 again connecting to the sample value Q(N). The control part 120 repeatedly performs the read process of the sample values Q0 to Q(N) from the audio memory 121 by the number of times obtained by adding 1 to a quotient as a result of dividing the period P1 by the reference time length L.

Subsequently, during a period P2 from exceeding the speed Y2 (for example, 0.5 [km/h]) of the running speed of the vehicle CR to reaching of the running speed to the speed Y3 (for example, 1.0 [km/h]), the control part 120 repeatedly reads out the combined-wave data AF2 having the higher frequency of the vehicle approaching sound by one level than the combined-wave data AF1 from the audio memory 121 instead of the combined-wave data AF1. Specifically, the control part 120 sequentially reads out the sample values Q0 to Q(N) included in the combined-wave data AF2 continuously to the sample value Q(N) of the combined-wave data AF1 read out from the audio memory 121 immediately before. Subsequently, instantaneously, the control part 120 sequentially reads out the sample values Q0 to Q(N) included in the combined-wave data AF2 again from the audio memory 121. The control part 120 repeatedly performs the read process of the sample values Q0 to Q(N) from the audio memory 121 by the number of times obtained by adding 1 to a quotient as a result of dividing the period P2 by the reference time length L.

Then, during a period P3 from when the running speed of the vehicle CR exceeds the speed Y3 to when the speed Y4 (for example, 1.5 [km/h]) is reached, the control part 120 repeatedly reads out the combined-wave data AF3 having the higher frequency of the vehicle approaching sound by one level than the combined-wave data AF2 from the audio memory 121 instead of the combined-wave data AF2. Specifically, the control part 120 sequentially reads out the sample values Q0 to Q(N) included in the combined-wave data AF3 continuously to the sample value Q(N) of the combined-wave data AF2 read out from the audio memory 121 immediately before. Subsequently, instantaneously, the control part 120 sequentially reads out the sample values Q0 to Q(N) included in the combined-wave data AF3 again from the audio memory 121. The control part 120 repeatedly performs the read process of the sample values Q0 to Q(N) from the audio memory 121 by the number of times obtained by adding 1 to a quotient as a result of dividing the period P3 by the reference time length L.

Accordingly, as illustrated in FIG. 9, the synthetic sound data signal SE in which the pieces of the combined-wave data AF read out from the audio memory 121 on the basis of the speed signal VS are connected is supplied to the audio synthesis part 122.

The audio synthesis part 122 supplies a vehicle approaching sound signal MSV in which each piece of the combined-wave data AF included in the synthetic sound data signal SE is converted into a configuration of an analog signal to the amplifier 123.

The amplifier 123 supplies the vehicle approaching sound signal MSV whose amplitude has been amplified to the speaker 13 as the vehicle approaching sound signal AL.

Therefore, according to the approaching notification device 12, the vehicle approaching sound having the frequency increased as the running speed of the vehicle CR increases is played on the basis of the combined-wave data AF1 to AF(S) stored in the audio memory 121.

Here, in the approaching notification device 12, as respective pieces of the combined-wave data AF1 to AF(S) representing the vehicle approaching sounds having the mutually different frequencies, as illustrated in FIG. 3, one representing the vehicle approaching sound of the length of the reference time length L by the series of the sample values Q0 to Q(N) of the sampling interval times T is employed. In this respect, in each combined-wave data AF, as illustrated in FIG. 3, the value of the first sample value Q0 in the series of the sample values Q0 to Q(N) is, for example, at zero level representing soundless. Furthermore, the value of the last sample value Q(N) is the same as the value of the first sample value Q0.

Therefore, in the generation of the vehicle approaching sound having the frequency following the running speed of the vehicle CR by connecting the combined-wave data AF having the configuration as illustrated in FIG. 3, in the connecting portion between the pieces of the combined-wave data AF, the values of both sample values and their phases are matched. Accordingly, an unnecessary noise sound caused by the significant change of the amplitude of the vehicle approaching sound at the connecting portion between the pieces of the combined-wave data is not generated, thus allowing playing a satisfactory vehicle approaching sound without an uncomfortable feeling.

With the combined-wave data AF1 to AF(S), even when a sound of one sample or plural samples is not played at the connecting portion between the pieces of the combined-wave data, since the values of the first sample value Q0 and the last sample value Q(N) are both at zero level, an unnecessary noise sound is less likely to be superimposed. Accordingly, also in the case of performing such play, a satisfactory vehicle approaching sound without an uncomfortable feeling can be played.

While the operation of the sound device is described with the example of the approaching notification device 12 configured to generate the vehicle approaching sound to notify a pedestrian of the approaching of the vehicle from the vehicle side in FIG. 6 and FIG. 7, the sound to be generated is not limited to the vehicle approaching sound.

Basically, as a sound device to generate a sound having a changing frequency, it is only necessary to include an audio memory, a control part, and an audio synthesis part below. That is, the audio memory (121) stores plural combined-wave data pieces [AF1 to AF(S)] individually representing respective audible sounds having mutually different frequencies by a series of sample values [Q0 to Q(N)] sampled by the identical sampling interval time (T). The first sample value [Q0] of the series of the above-described sample values and the last sample value [Q(N)] of the series of the sample values are the identical value in each of the plural combined-wave data pieces. The control part (120) performs a read access to repeatedly read out one of the combined-wave data pieces or sequentially read out the combined-wave data pieces from the audio memory to the audio memory. The audio synthesis part (122) converts the combined-wave data read out from the audio memory into an analog sound signal (MSV), and outputs the analog sound signal (MSV).

DESCRIPTION OF REFERENCE SIGNS

11 Vehicle speed sensor
12 Approaching notification device
13 Speaker
120, 202 Control part
121 Audio memory
122 Audio synthesis part
200 Combined wave data generation device
201 Program memory

The invention claimed is:

1. A combined-wave data generation method for generating plural combined-wave data pieces each representing a data series indicating one combined wave obtained by combining plural sound data pieces having mutually different frequencies, the combined-wave data generation method comprising:
a first step of obtaining a reference time length which is a time length of the one combined wave, a sampling interval time, and a frequency fluctuation rate of the one combined wave;
a second step of calculating a total number of samples in the data series indicating the one combined wave on the basis of the reference time length, the sampling interval time, and the frequency fluctuation rate;
a third step of calculating a rotation angle with respect to the sampling interval time on the basis of the total number of samples for each of the plural sound data pieces having the mutually different frequencies;
a fourth step of calculating combined values for the total number of samples, the combined value being obtained by combining respective values of the plural sound data pieces having the mutually different frequencies, the values being calculated on the basis of the rotation angles for the respective sampling interval times;
a fifth step of generating a series of the combined values for the total number of samples for the respective sampling time intervals as a data series of the one combined-wave data piece; and
a sixth step of generating data series representing the respective combined-wave data pieces by performing a sequence of the processes of the second step, the third step, the fourth step, and the fifth step by a predetermined times while changing the frequency fluctuation rate every time when the sequence of the processes is executed once.

2. The combined-wave data generation method according to claim 1, wherein
in the first step, vibration frequencies (integers) in the reference time length of the respective sound data pieces having the mutually different frequencies are obtained, and
the reference time length and the respective sound data pieces having the mutually different frequencies each have values determined on the basis of the sampling interval time.

3. The combined-wave data generation method according to claim 1, wherein
the values of the reference time length and the vibration frequencies of the respective sound data pieces are determined such that a first sample value and a last sample value in the data series of each combined-wave data piece have an identical value.

4. The combined-wave data generation method according to claim 1, wherein
the plural sound data pieces are n (n is an integer of 2 or more) sound data pieces representing respective first to n-th sine waves having mutually different frequencies, and
in the fourth step, sample values W1 to Wn are obtained by formulas below for each of plural audible sounds, and the sample values W1 to Wn are combined to generate the data series of each combined-wave data piece.

$$W1 = V1 \cdot \sin(2\pi t \cdot r1 + \alpha1)$$

$$W2 = V2 \cdot \sin(2\pi t \cdot r2 + \alpha2)$$

$$W3 = V3 \cdot \sin(2\pi t \cdot r3 + \alpha3)$$

$$\vdots$$

$$Wn = Vn \cdot \sin(2\pi t \cdot rn + \alpha n)$$

W1 to Wn: sample values of the respective first to n-th sine waves
V1 to Vn: amplitude values of the respective first to n-th sine waves
t: integers from 0 to the total number of samples
r1 to rn: rotation angles corresponding to the respective first
$\alpha1$ to $\alpha n$: shift rotation angles of 0° or 180°.

5. The combined-wave data generation method according to claim 4, wherein
at least one shift rotation angle of the shift rotation angles α1 to αn is 0°, and the other shift rotation angles other than the at least one shift rotation angle are 180°.

6. A non-volatile memory device storing a combined-wave data generation program executable by a control part of a combined-wave data generation device and configured to generate plural combined-wave data pieces each representing a data series indicating one combined wave obtained by combining plural sound data pieces having mutually different frequencies, wherein the combined-wave data generation program when executed comprises:
a first step of obtaining a reference time length which is a time length of the one combined wave, a sampling interval time, and a frequency fluctuation rate of the one combined wave;
a second step of calculating a total number of samples in the data series indicating the one combined wave on the basis of the reference time length, the sampling interval time, and the frequency fluctuation rate;
a third step of calculating a rotation angle with respect to the sampling interval time on the basis of the total number of samples for each of the plural sound data pieces having the mutually different frequencies;
a fourth step of calculating combined values for the total number of samples, the combined value being obtained by combining respective values of the plural sound data pieces having the mutually different frequencies, the values being calculated on the basis of the rotation angles for the respective sampling interval times;
a fifth step of generating a series of the combined values for the total number of samples for the respective sampling time intervals as a data series of the one combined-wave data piece; and
a sixth step of generating data series representing the respective combined-wave data pieces by performing a sequence of the processes of the second step, the third step, the fourth step, and the fifth step by a predetermined times while changing the frequency fluctuation rate every time when the sequence of the processes is executed once.

7. The non-volatile memory device according to claim 6, wherein the non-volatile memory device is one of a flash memory, a ROM memory or a hard disc memory.

8. A combined-wave data generation device configured to generate plural combined-wave data pieces each representing a data series indicating one combined wave obtained by combining plural sound data pieces having mutually different frequencies, the combined-wave data generation device comprising
a control part configured to execute:
a first step of obtaining a reference time length of which is a time length of the one combined wave, a sampling interval time, and a frequency fluctuation rate of the one combined wave;
a second step of calculating a total number of samples in the data series indicating the one combined wave on the basis of the reference time length, the sampling interval time, and the frequency fluctuation rate;
a third step of calculating a rotation angle with respect to the sampling interval time on the basis of the total number of samples for each of the plural sound data pieces having the mutually different frequencies;
a fourth step of calculating combined values for the total number of samples, the combined value being obtained by combining respective values of the plural sound data pieces having the mutually different frequencies, the values being calculated on the basis of the rotation angles for the respective sampling interval times;
a fifth step of generating a series of the combined values for the total number of samples for the respective sampling time intervals as a data series of the one combined-wave data piece; and
a sixth step of generating data series representing the respective combined-wave data pieces by performing a sequence of the processes of the second step, the third step, the fourth step, and the fifth step by a predetermined times while changing the frequency fluctuation rate every time when the sequence of the processes is executed once.

9. A waveform data generation method for generating plural waveform data pieces each indicating a data series representing one waveform, the waveform data generation method comprising:
a first step of obtaining a reference time length which is a time length of the one waveform, a sampling interval time, and a frequency fluctuation rate of the one combined wave;
a second step of calculating a total number of samples in the data series indicating the one waveform on the basis of the reference time length, the sampling interval time, and the frequency fluctuation rate;
a third step of calculating a rotation angle with respect to the sampling interval time on the basis of the total number of samples for the one waveform;
a fourth step of calculating a value of the one waveform for the total number of samples, the value being calculated on the basis of the rotation angle for each sampling interval time;
a fifth step of generating a series of the values of the one waveform for the total number of samples for the respective sampling time intervals as a data series of the one waveform data piece; and
a sixth step of generating data series representing the respective waveform data pieces by performing a sequence of the processes of the second step, the third step, the fourth step, and the fifth step by a predetermined times while changing the frequency fluctuation rate every time when the sequence of the processes is executed once.

\* \* \* \* \*